United States Patent
Arenson

[11] 3,726,085
[45] Apr. 10, 1973

[54] PREVENTING THERMAL POLLUTION OF AMBIENT WATER USED AS A PROCESS COOLING MEDIUM

[75] Inventor: Edwin M. Arenson, El Reno, Okla.

[73] Assignee: Back, Sivalls & Bryson, Inc., Oklahoma City, Okla.

[22] Filed: June 7, 1971

[21] Appl. No.: 150,448

[52] U.S. Cl. ........................................60/36, 62/52
[51] Int. Cl. .............................................F01k 25/00
[58] Field of Search ..........................60/95 R, 36, 38; 165/132, 45; 62/52

[56] References Cited

UNITED STATES PATENTS

| | | | |
|---|---|---|---|
| 2,120,909 | 6/1938 | Schmer | 60/95 |
| 2,637,531 | 5/1953 | Davidson | 165/45 |
| 3,061,276 | 10/1962 | Homan | 165/45 |
| 3,293,850 | 12/1966 | Morrison | 60/36 |
| 3,398,534 | 8/1968 | Hucks | 60/95 R |

Primary Examiner—Martin P. Schwadron
Assistant Examiner—H. Burks, Sr.
Attorney—Dunlap, Laney, Hessin & Dougherty

[57] ABSTRACT

The present invention relates to improvements in processes where a stream of liquefied cryogenic fluid is vaporized and superheated and utilized as fuel or the like, and one or more streams within the process are cooled. By the present invention, the stream of liquefied cryogenic fluid is passed in heat exchange relationship with a stream of ambient water so that the liquefied cryogenic fluid is vaporized and superheated and the water is cooled. The cooled stream of ambient water is then used to cool the one or more streams within the process so that the stream of ambient water is heated. The cooling and heating of the stream of ambient water are controlled so that the temperature of the stream exiting the process is substantially the same as the temperature of the stream entering the process thereby preventing thermal pollution of the ambient water source.

7 Claims, 2 Drawing Figures

PATENTED APR 10 1973 3,726,085

INVENTOR
EDWIN M. ARENSON

BY
Dunlap, Laney, Hessin & Dougherty
ATTORNEYS

PREVENTING THERMAL POLLUTION OF AMBIENT WATER USED AS A PROCESS COOLING MEDIUM

BACKGROUND OF THE INVENTION

1. Field of the Invention

The present invention relates generally to preventing thermal pollution of ambient water used as a process cooling medium, and more particularly, but not by way of limitation, to preventing thermal pollution of ambient water utilized in processes wherein liquefied cryogenic fluid is vaporized and superheated and utilized as fuel or the like.

2. Description of the Prior Art

Heretofore, it has been common practice to utilize a stream of ambient water as a process cooling medium. The term "ambient water" is used herein to mean water existing in large bodies such as oceans, rivers, lakes, etc.

In large plants such as electric power generation plants, chemical plants, etc., it has heretofore been highly economical to utilize a stream of ambient water as a process cooling medium. That is, a stream of ambient water is withdrawn from a body thereof such as an ocean or lake, passed in heat exchange relationship with various process streams requiring cooling thereby heating the water and then returned to the body of ambient water. With the recent emphasis on preventing thermal pollution of ambient water, i.e., the detrimental raising or lowering of the water temperature, the economics relating to the use of ambient water as a process cooling medium have changed. Specifically, in order to prevent thermal pollution, the temperature rise of the ambient water stream must be limited, e.g., 1° to 2° F, thereby requiring very large volumes of water to be utilized and high pumping and operating costs to be incurred.

In recent years, methods and apparatus have been developed for transporting liquefied natural gas to areas where natural gas is unavailable and vaporizing and superheating the liquefied natural gas so that it may be utilized as fuel. Commonly, the apparatus used for vaporizing and superheating the liquefied natural gas at the area of use includes elaborate heating equipment which brings about relatively high operating and maintenance costs. In order to reduce the cost of such apparatus, it has recently been proposed to vaporize and superheat liquefied cryogenic fluid by passing it in heat exchange relationship with a stream of ambient water. However, the use of ambient water as a heat exchange medium for vaporizing liquefied natural gas involves the same problems with respect to thermal pollution as does the use of ambient water as a process cooling medium. That is, in order to limit the temperature drop in the water to a permitted amount, high volumes of water are required bringing about high pumping and operating costs.

By the present invention, an improved process is provided wherein a stream of ambient water is utilized as a heating medium for vaporizing and superheating liquefied cryogenic fluid, such as liquefied natural gas, and as a process cooling medium without incurring thermal pollution.

SUMMARY OF THE INVENTION

The present invention relates to a process wherein a stream of liquefied cryogenic fluid is vaporized and superheated and utilized as fuel or the like, and one or more streams within said process require cooling comprising vaporizing and superheating the stream of liquefied cryogenic fluid by passing it in heat exchange relationship with a stream of ambient water thereby cooling the water, passing the cooled stream of ambient water in heat exchange relationship with the one or more process streams requiring cooling thereby heating the water, and controlling the cooling and heating of the stream of ambient water so that the temperature of the water exiting the process is substantially the same as the temperature of the water entering the process thereby preventing thermal pollution of the ambient water source.

It is, therefore, a general object of the present invention to provide an improved process wherein ambient water is used as a process cooling medium without incurring thermal pollution of the ambient water source.

A further object of the present invention is the provision of an improved process wherein a stream of ambient water is utilized as a heating medium for vaporizing and superheating liquefied cryogenic fluid and a process cooling medium without incurring thermal pollution of the water source.

Yet a further object of the present invention is the provision of an improved process for vaporizing and superheating a stream of liquefied natural gas while simultaneously generating electric power which process utilizes a stream of ambient water for heating and cooling in a manner such that thermal pollution of the water is prevented from occurring.

These and further objects, features and advantages of the present invention will be apparent from the following detailed description of preferred embodiments given for the purpose of disclosure and taken in conjunction with the accompanying drawings.

DESCRIPTION OF THE PREFERRED EMBODIMENTS

Figure 1:
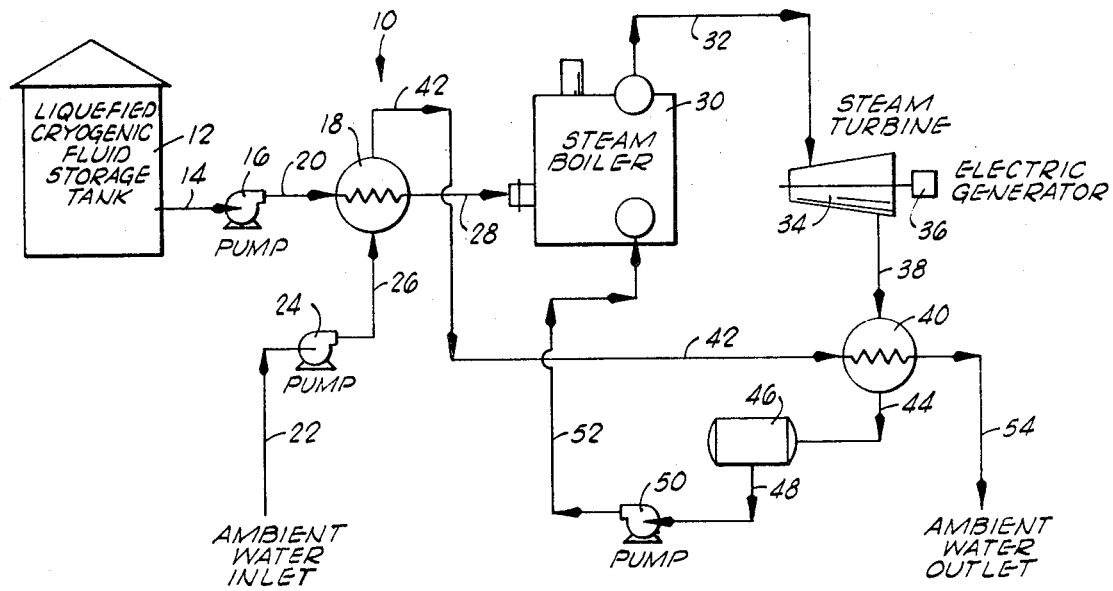
FIG. 1 illustrates in diagrammatic form one system which may be used for carrying out the improved process of the present invention.

Referring to the drawings, and specifically to FIG. 1, one system which may be utilized for carrying out the improved process of this invention is illustrated and generally designated by the numeral 10. In the system 10 a stream of liquefied cryogenic fluid from a conventional storage tank 12 or other source is passed by way of a conduit 14 to one or more conventional liquefied cryogenic fluid pumps 16. From the discharge of the pumps 16, the stream of liquefied cryogenic fluid passes to one or more ambient water heat exchangers 18 by way of a conduit 20.

The ambient water heat exchangers 18 may be conventional open rack water heat exchangers. The stream of ambient water is pumped from a source thereof through a conduit 22 connected to the suction of one or more conventional water pumps 24. The discharge of the pumps 24 is connected to a conduit 26 which leads the stream of ambient water to the heat exchangers 18. As the stream of ambient water passes through the exchangers 18 it exchanges heat with the stream of liquefied cryogenic fluid passing therethrough, thereby vaporizing and superheating the liquefied cryogenic fluid and cooling the stream of ambient water. The vaporized and superheated cryogenic fluid exits the heat exchangers 18 and is conducted by way of a conduit 28 to one or more conventional gas fired steam boilers 30 wherein all or a portion of the vaporized and superheated cryogenic fluid is utilized as fuel. Excess vaporized and superheated cryogenic fluid may be produced by the system 10 for use in another process or for distribution to domestic users. In this event, the portion of the vaporized and superheated cryogenic fluid produced in excess of that used as fuel for the boilers 30 is withdrawn from the system 10 by way of the conduit 29 attached to the conduit 28. The boiler or boilers 30 generate a stream of superheated steam which is conducted by way of a conduit 32 to one or more conventional steam turbines 34 which drive conventional electric generators 36. The spent steam from the turbines 34 is conducted by way of a conduit 38 to one or more heat exchangers 40.

The cooled stream of ambient water from the heat exchangers 18 is conducted by way of a conduit 42 to the heat exchangers 40. As the stream of ambient water passes through the heat exchangers 40, heat is transferred from the steam to the water causing the steam to be condensed and the water to be heated. The condensate produced passes by way of a conduit 44 to a condensate accumulator 46. From the accumulator 46 the condensate passes by way of a conduit 48 to one or more conventional water pumps 50. The discharge of the water pumps 50 is connected by a conduit 52 to the boiler or boilers 30. The stream of ambient water heated while passing through the exchangers 40 is conducted by a conduit 54 back to the ambient water source.

OPERATION OF THE SYSTEM 10

In operation of the system 10, a continuous stream of liquefied cryogenic fluid, such as liquefied natural gas, is pumped by the pumps 16 through the heat exchangers 18 wherein the cryogenic fluid is vaporized and superheated by exchange of heat with ambient water. The vaporized and superheated cryogenic fluid passes by way of a conduit 28 to the burners associated with the steam boilers 30. The quantity of liquefied cryogenic fluid vaporized and superheated in the exchangers 18 is controlled by conventional instruments (not shown) so that the fuel gas requirements of the boilers 30 are met. The quantity of ambient water passed by way of conduits 22 and 26 and pumps 24 through the heat exchangers 18 is controlled so that a predetermined temperature drop in the ambient water occurs, e.g., 4° to 5° F. The cooled stream of ambient water passes by way of the conduit 42 to the heat exchangers 40 wherein the water exchanges heat with spent steam conducted from the steam turbines 34 by way of the conduit 38. The system 10 and heat exchangers 40 are designed such that the ambient water is heated as it passes through the exchangers 40 a predetermined amount. For example, if the stream of ambient water is cooled 5° F in the heat exchangers 18, it may be heated 5° F in the heat exchangers 40. As will be understood, the system 10 is designed and the cooling and heating of the stream of ambient water controlled so that thermal pollution standards are met utilizing minimum sizes of equipment and incurring minimum operating costs.

The heat transferred to the stream of ambient water in the heat exchangers 40 causes the steam passing therethrough to be condensed. As previously described, the condensate produced is conducted to an accumulator 46 by way of a conduit 44, and then recycled back to the steam boilers 30 by way of the conduits 48 and 52 and the boiler water pumps 50. Thus, by the present invention as carried out in the system 10, electric power is generated economically through the use of ambient water without thermally polluting the ambient water source. That is, the use of a stream of ambient water for bringing about the condensation of the spent steam from the steam turbines 34 eliminates the need for elaborate and expensive steam condensers such as electric fan driven air condensers or a closed cooling water system. In addition, and most importantly, by the process of the present invention the stream of ambient water utilized is first cooled by the exchange of heat with the stream of liquefied cryogenic fluid and then utilized as a process cooling medium whereby the stream of ambient water is heated. The cooling and heating of the stream of ambient water are controlled such that the temperature of the stream of ambient water leaving the system 10 is substantially the same as the temperature of the ambient water stream entering the system 10 thereby preventing the thermal pollution of the ambient water source.

Figure 2:
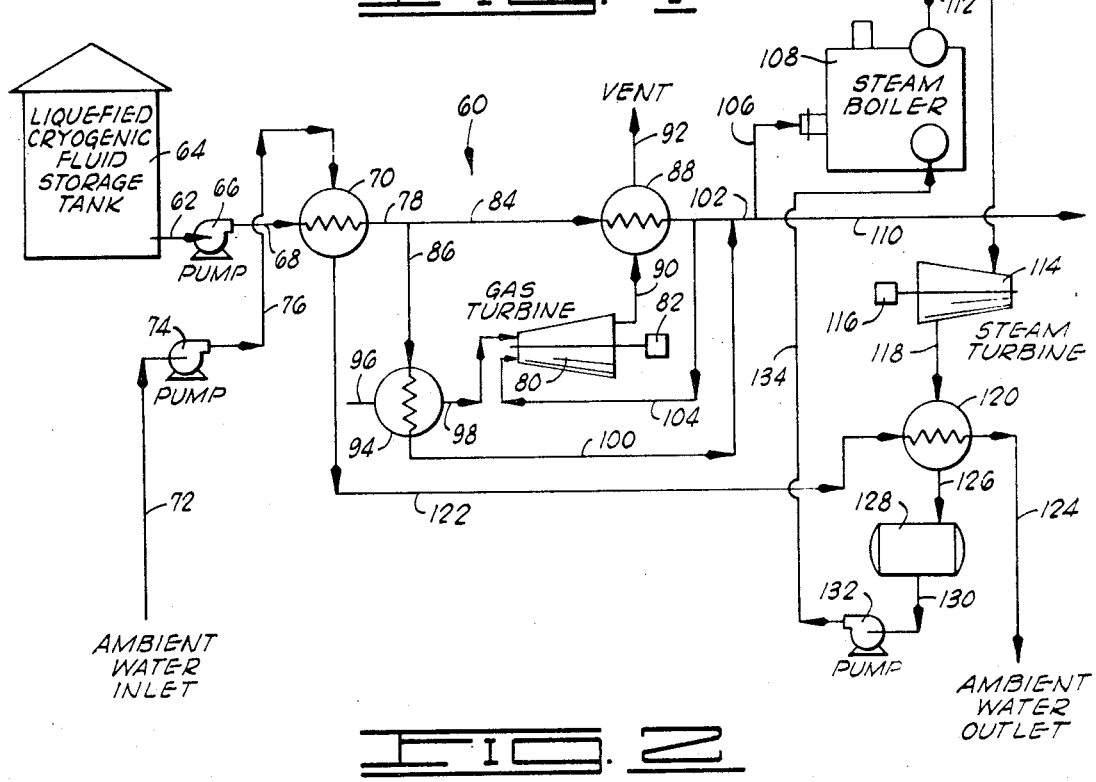
FIG. 2 illustrates in diagrammatic form an alternate system for carrying out the improved process of the present invention.

Referring now to FIG. 2, an alternate system for carrying out the improved process of the present invention is illustrated and generally designated by the numeral 60. A stream of liquefied cryogenic fluid is conducted by a conduit 62 from a storage tank 64 or other source to one or more liquefied cryogenic fluid pumps 66. From the pumps 66, the liquefied cryogenic fluid is conducted by a conduit 68 to one or more conventional water heat exchangers 70. A conduit 72 leads a stream of ambient water to the suction of one or more conventional water pumps 74 and a conduit 76 conducts the stream of water from the pumps to the exchangers 70. The stream of ambient water passes through the heat exchangers 70 and exchanges heat with the stream of liquefied cryogenic fluid passing therethrough causing the liquefied cryogenic fluid to be vaporized and the stream of ambient water to be cooled. The vaporized cryogenic fluid exits the exchanger by way of a conduit 78. A conventional gas turbine 80 is provided of the type which produces large quantities of hot exhaust gases through the combustion of fuel and air. The turbine 80 operates a conventional electric generator 82. The conduit 78 is connected to a pair of conduits 84 and 86 and conventional controls are provided (not shown) for dividing the stream of vaporized cryogenic fluid into major and minor portions, the major portion thereof passing through the conduit 84 with the minor portion passing through the conduit 86. The major portion of the vaporized cryogenic fluid from the exchangers 70 is conducted by the conduit 84 to a heat exchanger 88 wherein it exchanges heat with the exhaust gases produced by the turbine 80. The exhaust gases generated by a turbine 80 are conducted to the exchanger 88 by a conduit or duct 90. After passing through the exchanger 88, the spent exhaust gases are vented to the atmosphere by way of a conduit 92. Thus, as the vaporized cryogenic fluid from the exchangers 70 passes through the exchanger 88, heat is transferred between it and the exchaust gases from the turbine 80 so that the cryogenic fluid is superheated to a desired temperature level.

The minor portion of the vaporized cryogenic fluid from the exchangers 70 passes by way of conduit 86 to a heat exchanger 94. Input air for the turbine 80 drawn from the atmosphere by way of a conduit 96 passes through the exchanger wherein it is cooled and then is conducted by a conduit 98 to the turbine 80. The vaporized cryogenic fluid passing through the exchanger 94 exchanges heat with the air causing the air to be cooled and the cryogenic fluid to be heated.

The major portion of the cryogenic fluid stream from the exchangers 70 which is superheated to a desired temperature level in the exchanger 88 is conducted from the exchanger 88 by way of a conduit 102. A conduit 100 connected to the exchanger 94 conducts the minor portion of the vaporized cryogenic fluid to the conduit 102 so that the portions are combined in the conduit 102. A small portion of the cryogenic fluid superheated in the exchangers 88 is passed by way of a conduit 104 to the gas turbine 80 wherein it is utilized as fuel and a small portion of the vaporized and superheated cryogenic fluid stream passing through the conduit 102 is conducted by way of a conduit 106 to one or more conventional steam boilers 108 wherein the cryogenic fluid is utilized as fuel. The remaining vaporized and superheated cryogenic fluid is conducted by a conduit 110 connected to the conduit 102 to a point of use or distribution.

Superheated steam generated by the boilers 108 is conducted by a conduit 112 to one or more conventional steam turbines 114. The steam turbines 114 drive conventional electric generators 116. The spent steam from the turbines 114 is conducted by a conduit 118 to one or more heat exchangers 120 and the stream of ambient water exiting the exchangers 70 is conducted by a conduit 122 to the exchangers 120. Heat is exchanged between the spent stream and the stream of ambient water as they pass through the exchangers 120 causing the steam to be condensed and the ambient water to be heated. The heated stream of ambient water is conducted from the exchangers 120 by way of conduit 124 which leads it back to the source thereof. The condensate exiting the exchangers 120 passes by way of a conduit 126 into a condensate accumulator 128. From the accumulator 128 the condensate passes by way of a conduit 130 to one or more conventional water pumps 132. From the discharge of the water pumps 132 the condensate is conducted by a conduit 134 back to the steam boilers 108.

OPERATION OF THE SYSTEM 60

In operation of the system 60, a stream of liquefied cryogenic fluid such as liquefied natural gas is conducted from the storage tank 64 to the exchangers 70 by way of the conduits 62 and 68 and pumps 66. As previously described, a stream of ambient water is pumped through the exchangers 70 by way of the conduits 72 and 76 and and the water pumps 74. As the streams of ambient water and cryogenic fluid pass through the exchangers 70, heat is exchanged between the cryogenic fluid and the ambient water causing the cryogenic fluid stream to be vaporized and the ambient water to be cooled. The rate of ambient water passing through the heat exchangers 70 is controlled such that the ambient water is cooled a predetermined amount.

The major portion of the vaporized cryogenic fluid stream exiting the exchangers 70 and passing by way of conduit 84 to the turbine exhaust gas heat exchangers 88 is superheated to a desired temperature level by heat exchange with the exhaust gases. The minor portion of the vaporized cryogenic fluid from the exchangers 70 passing by way of the conduit 86 through the exchanger 94 exchanges heat with combustion air passing to the turbine 80 cooling the air. As is well understood by those skilled in the art, cooling the input combustion air to the turbine 80 is advantageous in that the power output is increased accordingly. The cryogenic fluid exiting the exchanger 94 passes by way of conduit 100 to the conduit 102 wherein it combines with the cryogenic fluid stream superheated in the exchangers 88. The system 60 is designed so that a quantity of vaporized and superheated cryogenic fluid is produced in excess of the quantity required for fuel within the system 60 so that a continuous stream of vaporized and superheated cryogenic fluid exits the system 60 by way of the conduit 110 and is conducted to a point of use or distribution.

The steam boilers 108 and steam turbines 114 are operated in an identical manner as described above for the steam boilers 30 and turbines 34 of the system 10. As will be understood, electric power is produced by the generators 82 and 116. A minor portion of the electric power produced is utilized for operating the pumps 74, 66 and 132 of the system 60 with the major portion of the electric power being conducted from the system 60 to a point of use or distribution.

The ambient water stream exiting the exchangers 70 is conducted by the conduit 122 to the exchangers 120. As the stream of ambient water passes through the exchangers 120, heat is exchanged between the ambient water and the spent steam conducted to the exchangers 120 by the conduit 118, causing the steam to be condensed and the ambient water to be heated. As described above for the system 10, the system 60 and the exchangers 120 are designed in such a manner that the stream of ambient water passing through the exchangers 120 and conducted to the source of ambient water by way of the conduit 124 is heated a desired amount. That is, the cooling of the stream of ambient water in the exchangers 70 and the heating of the stream of ambient water in the exchangers 120 are controlled such that the temperature of the stream of ambient water returning to the ambient water source is substantially the same as the temperature of the ambient water source thereby preventing the pollution thereof.

As will be understood by those skilled in the art, the system 60 is particularly suitable for use in areas where natural gas is normally unavailable. By the improved process as carried out in the system 60, vaporized and superheated natural gas is produced for distribution and use in the area as well as electric power. Most importantly, the natural gas and electric power are produced economically through the use of ambient water as a process heating and cooling medium while preventing the thermal pollution of the water source.

In order to present a clear understanding of the improved process of the present invention, the following examples are given:

EXAMPLE 1

A 284,735 lb/hr stream of liquefied natural gas is pumped by the pumps 16 of the system 10 to the ambient water heat exchangers 18 at a pressure of 800 psig and a temperature of −260° F. As the liquefied cryogenic fluid stream passes through heating tubes disposed in the exchangers 18, heat is exchanged between the liquefied cryogenic fluid and a 19,370 gpm stream of ambient water conducted to the exchangers 18 by way of the conduit 22 conduit, 26 and pumps 24 at a temperature of 70° F. 96.8 mm btu/hr are transferred from the ambient water to the liquefied cryogenic fluid causing the cryogenic fluid to be vaporized and heated to a temperature of 30° F. The temperature of the ambient water passing through the exchangers 18 is reduced to a temperature of 60° F. 4.01 mmscf/day of vaporized natural gas is conducted from the exchangers 18 to the boilers 30 by the conduit 28, and 148 mmscf/day of vaporized natural gas is conducted to a gas distribution system by way of the conduit 29. A 117,000 lb/hr stream of superheated steam at a pressure of 440 psia and a temperature of 800° F is produced by the steam boilers 30 and is conducted by the conduit 32 to the steam turbines 34. The electric generators 36 driven by the steam turbines 34 produce a total of 12,550 kw/hr of electric power. The spent steam from the turbines 34 (100 percent quality saturated steam) is conducted by the conduit 38 to the exchangers 40. The 19,370 gpm stream of ambient water from the exchangers 18 at a temperature of 60° F is conducted to the exchangers 40 by way of the conduit 42 and passes through heating tubes disposed therein. 96.8 mm btu/hr of heat is exchanged between the steam and ambient water passing through the exchangers 40, heating the ambient water stream to a temperature of 70° F and condensing the steam. The ambient water exiting the exchangers 40 is conducted by the conduit 54 to the source thereof at a temperature of 70° F.

EXAMPLE 2

A 1,496,500 lb/hr stream of liquefied cryogenic fluid is conducted to the exchangers 70 of the system 60 at a pressure of 800 psig and a temperature of −260° F. A 95,200 gpm stream of ambient water at a temperature of 70° F is conducted to the exchangers 70 and 475.89 mm btu/hr of heat is exchanged between the ambient water and the liquefied cryogenic fluid causing the liquefied cryogenic fluid to be vaporized and heated to a temperature of 0° F. The stream of ambient water is cooled to a temperature of 60° F. A major portion of the vaporized natural gas from the exchangers 70 (1,202,220 lb/hr) is passed by the conduit 84 to the exchanger 88 wherein an additional 133.0 mm btu/hr of heat is transferred to the natural gas causing it to be superheated to a temperature of 175° F. 780,000 lb/hr of turbine exhaust gases from the turbine 80 at a temperature of 950° F are conducted to the exchanger 88 by the duct 90. The heat exchange effected reduces the temperature of the turbine exhaust gases to 300° F which are vented to the atmosphere by the duct 92. A minor portion of the vaporized natural gas from the exchangers 70 (294,280 lb/hr) passes by way of the conduit 86 through the exchanger 94. 767,800 lb/hr of combustion air at 80° F (50 percent water saturated) passes through the exchanger 94 and a 12.19 mm btu/hr of heat is exchanged between the air and the vaporized natural gas passing therethrough causing the air to be cooled to a temperature of 40° F. The natural gas passing through the exchanger 94 is heated to a temperature of 3° F and is conducted by way of a conduit 100 to the conduit 102. The natural gas exiting the exchanger 88 at a temperature of 175° F combines with the natural gas from the conduit 100 in the conduit 102 resulting in a combined stream of 1,496,500 lb/hr at a temperature of 140° F. A 12,028 lb/hr stream of natural gas is withdrawn from the conduit 102 by way of the conduit 104 and utilized as fuel in the turbine 80 and a 36,868 lb/hr stream of natural gas is withdrawn from the conduit 102 by way of the conduit 106 and utilized as fuel for the steam boilers 108. The remaining natural gas (1,447,604 lb/hr) is conducted by the conduit 110 to a point of use or distribution. A 575,135 lb/hr stream of superheated steam at a pressure of 440 psia and a temperature of 800° F is conducted to the steam turbines 114 by the conduit 112. 61,692 kw/hr of electric power are produced by the electric generators 116 driven by the turbines 114 and 18,500 kw/hr of electric power is produced by the generator 82 driven by the turbine 80. 453,226 lb/hr of spent steam from the turbines 114 (100 percent quality saturated steam) is conducted by the conduit 118 to the heat exchangers 120. The ambient water stream (95,200 gpm) at a temperature of 60° F from the exchangers 70 is passed through the exchangers 120 causing 475.89 mm btu/hr of heat to be exchanged between the water and the steam passing through the exchangers 120. As a result, the ambient water is heated to a temperature of 70° F and the steam is condensed. The ambient water exiting the exchangers 120 is conducted by the conduit 124 to the source thereof.

Thus, the present invention is well adapted to carry out the objects and attain the ends and advantages mentioned as well as those inherent therein. While presently preferred systems for carrying out the process of the present invention are given for the purpose of disclosure, numerous changes in the systems and arrangement of process steps may be made which will readily suggest themselves to those skilled in the art and which are encompassed within the spirit of the appended claims.

What is claimed is:

1. In a process wherein a stream of liquefied cryogenic fluid is vaporized and superheated and utilized as fuel or the like, and one or more streams within said process are cooled, the improvement comprising:

vaporizing and superheating said stream of liquefied cryogenic fluid by passing it in heat exchange relationship with a stream of ambient water thereby cooling the water;

passing the cooled stream of ambient water in heat exchange relationship with the said one or more streams within said process so that the process streams are cooled and the stream of ambient water is heated; and controlling the heating and cooling of the stream of ambient water so that the temperature thereof exiting said process is substantially the same as the temperature thereof entering said process thereby preventing the thermal pollution of the ambient water source.

2. The process of claim 1 wherein said cryogenic fluid is natural gas.

3. In a process wherein steam is generated by gas fired steam boiler apparatus and utilized to drive steam turbines or the like, the spent steam being condensed and recycled to the steam boiler apparatus and the fuel gas for said steam boiler apparatus being produced by vaporizing and superheating a stream of liquefied natural gas, the improvement in said process comprising:

vaporizing and superheating said stream of liquefied natural gas by passing it in heat exchange relationship with a stream of ambient water so that the stream of ambient water is cooled;

passing the cooled stream of ambient water in heat exchange relationship with said spent steam from said steam turbines so that said steam is condensed and the ambient water is heated; and controlling the cooling and heating of the stream of ambient water so that the temperature thereof exiting said process is substantially the same as the temperature thereof entering the process thereby preventing the thermal pollution of the ambient water source.

4. The process of claim 3 wherein the steam turbines are utilized for driving electric power generators.

5. A process for vaporizing and superheating a stream of liquefied natural gas while simultaneously generating electric power, which comprises the steps of:

passing the stream of liquefied natural gas in heat exchange relationship with a stream of ambient water so that the stream of liquefied natural gas is vaporized and superheated and the stream of ambient water is cooled;

utilizing a portion of the vaporized and superheated natural gas as fuel for one or more steam boilers, said boilers generating steam utilized for driving one or more steam turbines which in turn drive one or more electric generators;

condensing the spent steam exiting the steam turbines by passing the steam in heat exchange relationship with said cooled ambient water stream thereby heating the ambient water; and controlling the heating and cooling of the stream of ambient water so that the temperature thereof exiting said process is substantially the same as the temperature thereof entering the process thereby preventing the thermal pollution of the ambient water source.

6. The process of claim 5 which is further characterized to include the steps of:

utilizing a portion of the vaporized and superheated natural gas as fuel for one or more gas turbines, which gas turbines drive electric generators; and exchanging heat between the hot exhaust gases generated by said gas turbines and the stream of vaporized and superheated natural gas to further superheat said natural gas to a desired temperature.

7. The process of claim 6 which is further characterized to include the steps of:

passing a portion of the vaporized and superheated natural gas in heat exchange relationship with the input air to said gas turbine so that the air is cooled thereby increasing the power output of said turbine.

* * * * *